Feb. 11, 1958  E. K. HANSEN  2,823,084
BEARING FOR ARMATURE SHAFTS OF ELECTRIC MOTORS
Filed Nov. 7, 1955
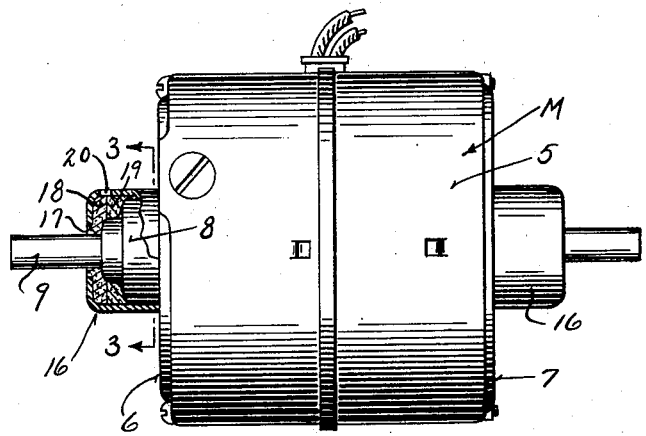
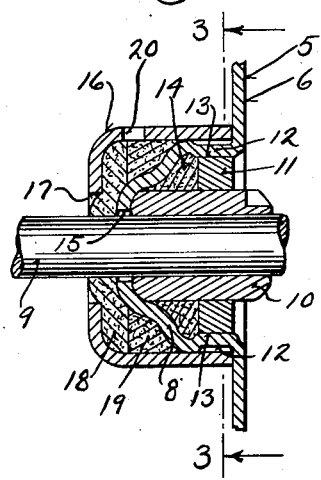 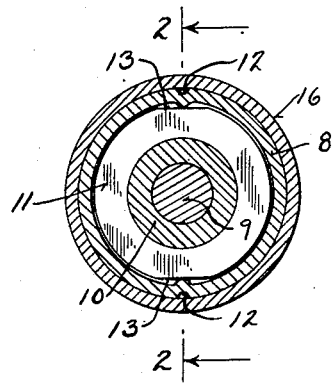
INVENTOR
EVERETT K. HANSEN
BY
*Young and Wright*
ATTORNEYS United States Patent Office 2,823,084
Patented Feb. 11, 1958

2,823,084

BEARING FOR ARMATURE SHAFTS OF ELECTRIC MOTORS

Everett K. Hansen, Racine, Wis., assignor to Rae Motor Corporation, Racine, Wis., a corporation Application November 7, 1955, Serial No. 545,199

3 Claims. (Cl. 308—22)

This invention appertains broadly to the lubrication of bearings, and more particularly to a novel means for insuring the proper lubrication of the end bearings of the armature shafts of small electric motors.

One of the primary objects of my invention is to provide novel means for free association with the bearing bosses of an electric motor, without change thereto, for facilitating the lubrication of the bearings of the motor shaft and for effectively preventing the entrance of dust and dirt into the bearings.

Another salient object of my invention is the provision of end caps adapted to be placed over and to house the bearing bosses of the motor, and for receiving and retaining felt pads or washers around the bosses and motor shaft with means for saturating the felt pads or washers with a desired type of lubricant, whereby such lubricant will be retained for supplying the lubricant to the bearings as needed through the shaft openings in the bearing bosses.

A further important object of my invention is the provision of an inexpensive, but efficient means, for quick association with the bearing bosses of a motor casing for effectively supplying a lubricant thereto.

A still further object of my invention is the provision of a simple means for retaining the bearings in the bosses against turning movement.

With these and other objects in view, the invention consists in the novel construction, arrangement and formation of parts, as will be hereinafter more specifically described, claimed and illustrated in the accompanying drawing, in which drawing:

Figure 1 is a side elevational view of an electric motor equipped with the novel lubricating caps, one of said caps being shown partly broken away and in section;

Figure 2 is an enlarged, detailed, fragmentary longitudinal sectional view through the end wall of the motor showing the novel construction of the bearing and a lubricating cap therefor, the section being taken on the line 2—2 of Figure 3 looking in the direction of the arrows; and Figure 3 is a transverse sectional view through the bearing and cap taken on the line 3—3 of Figures 1 and 2 looking in the direction of the arrows.

Referring to the drawing in detail, wherein similar reference characters are shown throughout the several views, the letter M generally indicates an electric motor, which can be considered of a type now commonly found in the open market.

In the present showing, the motor is of a small frictional horse power character. The motor M includes a casing 5 having end walls or bells 6 and 7. Each of the end walls have struck out from the axial center bearing bosses 8 for the armature shaft 9 of the motor. The shaft 9 is mounted in suitable antifriction bearings 10, and these bearings have pressed thereon rings 11. The bearings 10 and the rings 11 are received within the bosses 8 and the bosses at opposite diametric points have struck in ribs 12. The rings 11 at opposite sides have flattened edges 13 and the ribs 12 engage the flattened portions whereby turning movement of the rings 11, and consequently the bearings 10, is prevented. The bearings are preferably of the self-aligning type and have limited radial movement in the bearing bosses and the ribs 12 and the flattened portions 13 permit such limited movement. It is preferred to place a felt washer 14 around the bearings 10 in advance of the rings 11 and the felt washers are slightly compressed during the assembly of the motor. By referring to Figure 2, it can be seen that the bearing bosses 8 are provided with axial openings 15 for receiving the armature shaft 9 and that the openings 15 are of a slightly greater diameter than the diameter of the shaft 9.

In order to provide proper lubrication for the bearings 10, I provide end caps 16, which are adapted to snugly fit over and to house the bearing bosses 8. The caps 16 are of a cup shape and are provided with axially disposed openings 17 whereby the caps can be slipped over the ends of the shaft 9 and then over the bearing bosses. It can be seen that the inner edges of the caps fit tight against the end walls 6 of the motor casing 5, and in actual practice the caps snugly and frictionally engage the bearing bosses at the greatest diameter of said bosses.

Felt or equivalent washers or pads 18 and 19 are fitted within the caps, so that when the caps are forced on the bearing bosses the pads will be slightly compressed around the bearing bosses and against the shaft 9 and into the openings 17 for closing such openings. The caps are each provided with an oil filling opening 20, and obviously, through this opening, the desired grade of lubricant can be introduced for saturating the felt or equivalent washers or pads 18 and 19. During the operation of the motor, the lubricant from the pads will gradually creep from the pads through the openings in the bearing bosses to the bearings 10 and thus these bearings will be lubricated.

New lubricant can be introduced into the caps through the openings 20 when necessary or desirable. Pads also form an effective means for preventing the entrance of dust and dirt into the bearings through the bosses 8.

From the foregoing description, it can be seen that I have provided an efficient and simple means for association with a standard motor for insuring the proper lubrication of the bearings of the motor. The construction on the caps 16 is such that no change in the motor casing is needed and the end caps can be placed in proper position without the use of tools.

Various changes in details may be made without departing from the spirit or the scope of my invention, but what I claim as new is:

1. In an electric motor having a casing provided with end walls, bearing bosses projecting outwardly from the end walls having struck in ribs, bearings fitted in the bosses, rings on said bearings having flattened portions receiving the ribs, and an armature shaft rotatably mounted in the bearings and extending outwardly through the bosses.

2. In an electric motor having a casing provided with end walls, bearing bosses projecting outwardly from the end walls having struck in ribs, bearings fitted in the bosses, rings on said bearings having flattened portions receiving the ribs, an armature shaft rotatably mounted in the bearings and extending outwardly through the bosses, and means for supplying a lubricant to the bearings including an end cap fitted over each boss and housing said boss.

3. In an electric motor as defined in claim 2, said end caps having absorbent washers therein and pressed around the exterior of a respective boss and shaft.

References Cited in the file of this patent

UNITED STATES PATENTS

| | | |
|---|---|---|
| 980,579 | Wigglesworth | Jan. 3, 1911 |
| 2,272,029 | Benson | Feb. 3, 1942 |
| 2,583,141 | Esarey | Jan. 22, 1952 |
| 2,751,265 | Wightman | June 19, 1956 |